UNITED STATES PATENT OFFICE.

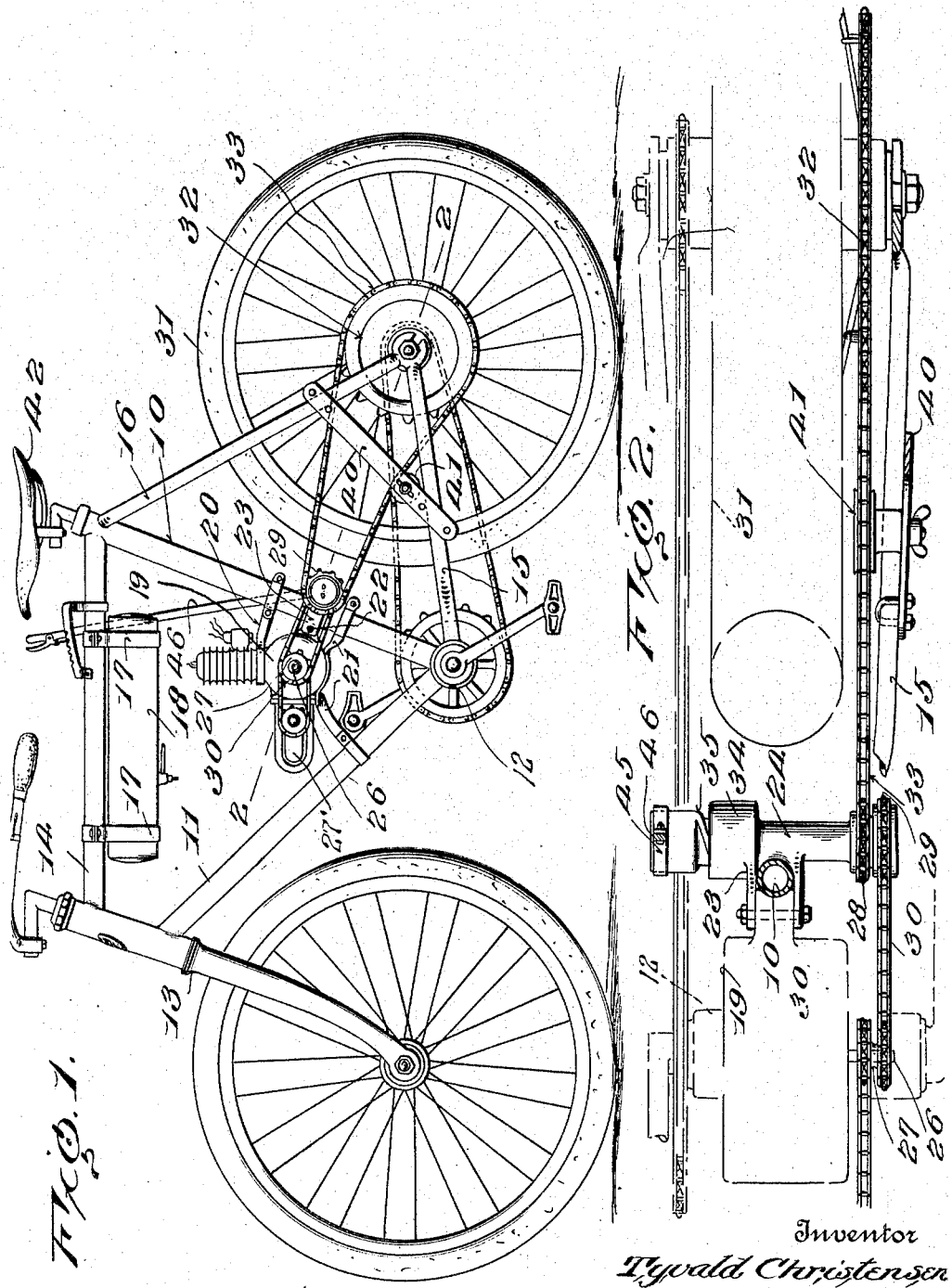

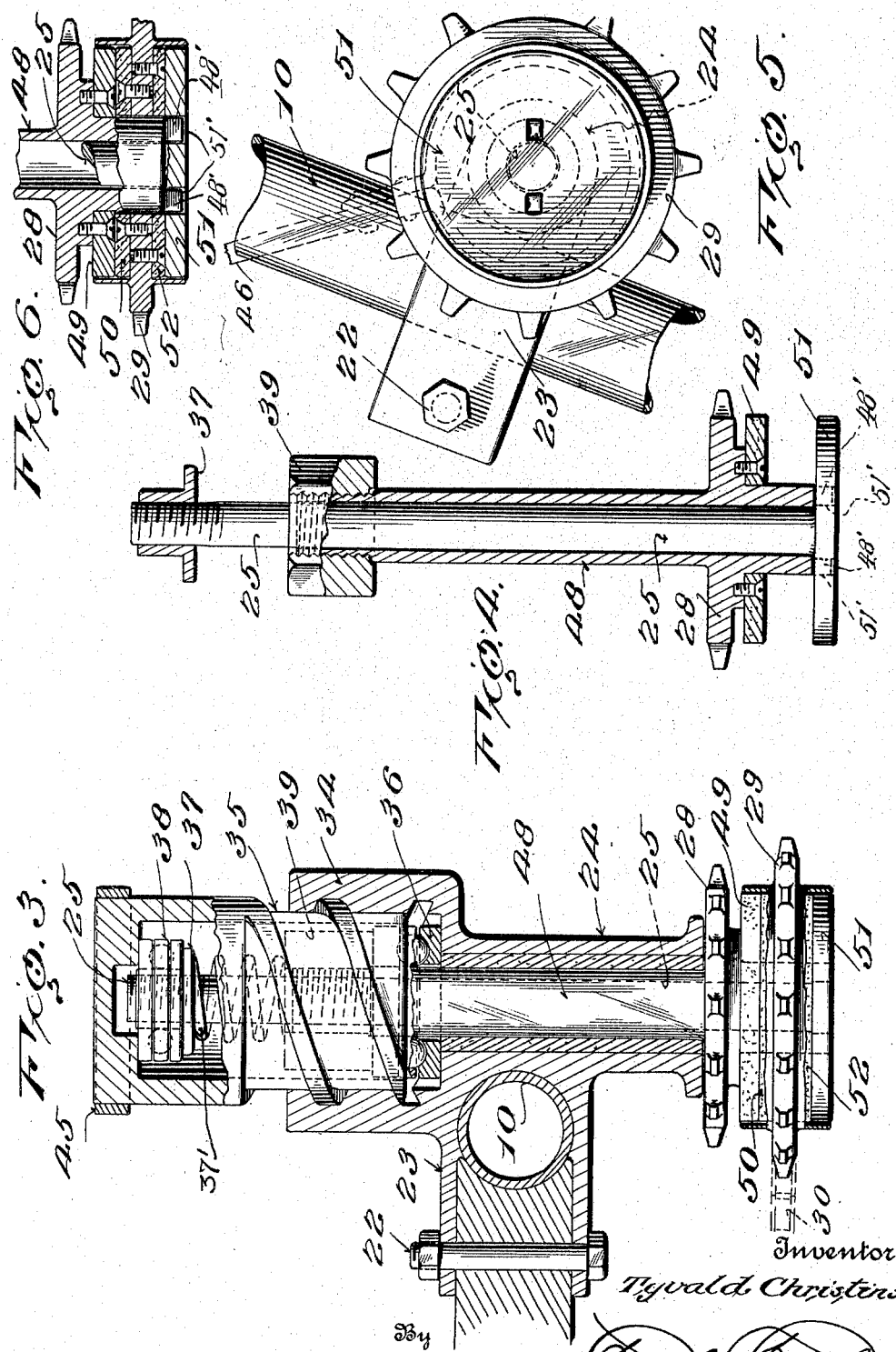

TYVALD CHRISTENSEN, OF PORT RICHMOND, NEW YORK.

MOTOR-BICYCLE.

1,308,022.     Specification of Letters Patent.     Patented July 1, 1919.

Application filed January 24, 1919. Serial No. 272,887.

*To all whom it may concern:*

Be it known that I, TYVALD CHRISTENSEN, a citizen of Norway, residing at Port Richmond, in the county of Richmond, State of New York, have invented certain new and useful Improvements in Motor-Bicycles; and I do hereby declare the following to be a full, clear, and exact description of the invention, such as will enable others skilled in the art to which it appertains to make and use the same.

This invention relates to new and useful improvements in motor driven bicycles and particularly to motorcycles.

One object of the present invention is to provide a novel and improved engine and driving means whereby the ordinary bicycle can be easily converted into a motorcycle.

Another object is the provision of a novel and improved form of driving clutch and the means for attaching the same to the crank case of the engine and to the bicycle frame.

Other objects and advantages will be apparent from the following description when taken in connection with the accompanying drawings.

In the drawings:

Figure 1 is a side elevation of a bicycle equipped with my improved engine.

Fig. 2 is a top plan view of the engine and driving mechanism, the frame being in section.

Fig. 3 is an enlarged horizontal sectional view through the clutch.

Fig. 4 is a detail view of the shafts of the clutch.

Fig. 5 is an enlarged elevation of the sprocket 29 and the manner of attaching it to the frame.

Fig. 6 is a fragmentary sectional view through one end of the clutch.

Referring particularly to the accompanying drawings, 10 represents the rear seat post or bar of the bicycle, 11 the bar connecting the crank hanger 12 with the front fork 13, 14 the upper horizontal bar, and 15 the lower horizontal bar which connects the crank hanger with the rear fork 16 of the bicycle frame, all of which are used in connection with the present invention.

Suspended on the bar 14, by the straps 17, is the gasolene tank 18, and mounted above said tank, on said bar, is the control lever 46 for the clutch, which will later be described.

The casing 19 of the engine is secured to the bar 10 by means of the straps 20, and to the bars 10 and 11 by the curved bracing straps 21. Thus the engine is held firmly in position and prevented from any tendency to turn axially on the bar 10, as will readily be understood from an inspection of the drawings. Secured to the crank case of the engine, by the bolts 22, is a casting 23, which includes a transversely extending tubular bearing member 24 for the shaft 25. On one end of the engine shaft 26 is a double sprocket wheel 27, the inner portion of which drives the magneto 27′, and on the adjacent end of the hollow shaft 48 are the sprocket wheels 28 and 29, a chain 30 being engaged around the outer portion of the sprocket 27 and the sprocket 29, for transmitting motion from the engine shaft to the shaft 48. Clamped to the spokes of the rear wheel 31 of the bicycle is a large sprocket wheel 32, and engaged around this wheel 32 and the other sprocket wheel 28, is a drive chain 33, for transmitting motion to the wheel 32.

Threaded in the hollow boss 34, formed on the other end of the tubular bearing member 24, is a member 35. The adjacent end of the shaft 25 extends to the outer end of the member 35, disks 37 being carried by this end of the shaft 25 and between said disks are disposed the ball thrust bearings 38. A collar or ring 39 is on the hollow shaft 48 within the boss 34, and encircling the shaft 25 with its ends against the collar 39 and the disks 37, is a coil spring 37′ which normally clamps the sprocket 29 between the disks 49 and 51, the disk 51 being rigidly mounted on the end of the shaft 25, as clearly seen in Fig. 4. Secured to and extending between the bars 10 and 16 is an inclined brace member 40 on which is mounted an idler 41, and which bears against the lower lap of the drive chain 33 to hold the same in proper taut condition.

A collar 45 is secured around the outer end of the member 35, and has a lever 46 extending upwardly therefrom which, when moved in one direction will turn the member 35 so that it will screw into the casting portion 24, and move the shaft 25, with the disk 51, through the medium of the hollow shaft 48, with the result that the sprocket 29, carried by the other end of the shaft 48, will be free to turn. Disposed longitudinally within the member 24, and concentrically around the shaft 25, is the hollow shaft 48 herein mentioned, the inner end of which terminates within the adjacent end of the member 35 where it receives the before-mentioned collar 39. On the end of the sleeve or hollow shaft 48, adjacent the sprocket 29, there is secured the sprocket 28, before-mentioned, and secured to the outer face of this sprocket is the friction disk 49 which is adapted to be engaged by the friction disk 50 carried by the adjacent face of the sprocket 29, when the shaft 25, together with the disks 51, is moved inwardly, under the influence of the coil spring. This sprocket wheel 29, however, is loosely mounted on the shaft 48, outwardly of the disk 49. The friction disk 51 engages with a friction disk 52, secured to the outer face of the sprocket 29, when the shaft is moved, as above mentioned. Thus the sprockets 28 and 29 can be manipulated so as to rotate independently or in unison. By this means the drive to the rear wheel can be thrown into or out of operation by the movement of the lever 46, as will be apparent from the drawings.

The disk 51 is formed with a pair of openings 51' which receive the pair of lugs 48' carried by the adjacent end of the shaft 48. This further assists the coupling or clutching together of the sprockets 28 and 29.

What is claimed is:

1. A clutch mechanism for a bicycle motor including a tubular casing associated with the bicycle frame and motor, a hollow shaft disposed through the casing, a sprocket wheel rigidly mounted on one end of the shaft, a second shaft rotatably and slidably disposed within the first shaft, a sprocket wheel on the end of said shaft adjacent the first sprocket and movable toward and away from said first sprocket, friction elements carried by said sprockets, and means for moving the second sprocket toward and away from the first sprocket.

2. In a clutch mechanism, the combination with the shaft of an engine and the rear sprocket wheel of a bicycle, of a bearing mounted on the bicycle adjacent the said shaft, a sprocket on the engine shaft, a hollow rotatable shaft in the bearing, a sprocket rigidly carried by the said hollow shaft, a drive chain engaged with said sprockets, a shaft rotatably disposed in the hollow shaft and slidable longitudinally therein, a sprocket wheel loosely mounted on the last-named shaft adjacent the first sprocket, means for holding the loose sprocket normally and yieldably in engagement with the first sprocket, and means for moving away therefrom.

In testimony whereof, I affix my signature, in the presence of two witnesses.

TYVALD CHRISTENSEN.

Witnesses:
 ANTON CHRISTENSEN,
 SIGVALD EMIL WILSEN.

Copies of this patent may be obtained for five cents each, by addressing the "Commissioner of Patents, Washington, D. C."